United States Patent
Van Elburg et al.

(10) Patent No.: US 9,648,048 B2
(45) Date of Patent: *May 9, 2017

(54) MESSAGE HANDLING IN AN IP MULTIMEDIA SUBSYSTEM

(71) Applicant: TELEFONAKTIEBOLAGET L M ERICSSON (PUBL), Stockholm (SE)

(72) Inventors: Hans Erik Van Elburg, Bunde (NL); Alf Heidermark, Saltsjöbaden (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 15/176,333

(22) Filed: Jun. 8, 2016

(65) Prior Publication Data

US 2016/0285919 A1  Sep. 29, 2016

Related U.S. Application Data

(63) Continuation of application No. 12/094,752, filed as application No. PCT/EP2006/067789 on Oct. 26, 2006, now Pat. No. 9,392,027.

(30) Foreign Application Priority Data

Nov. 15, 2005  (GB) .................................. 0524036.1

(51) Int. Cl.
  *H04L 12/28*  (2006.01)
  *G06F 15/16*  (2006.01)
  (Continued)

(52) U.S. Cl.
  CPC .... *H04L 65/1006* (2013.01); *H04L 29/12594* (2013.01); *H04L 61/3085* (2013.01);
  (Continued)

(58) Field of Classification Search
  CPC ............. H04L 65/1016; H04L 65/1006; H04L 65/1096; H04L 67/147
  (Continued)

(56) References Cited

U.S. PATENT DOCUMENTS

7,894,593 B2   2/2011  Garcia-Martin et al.
2003/0012172 A1  1/2003  Choi et al.
(Continued)

FOREIGN PATENT DOCUMENTS

WO   2004075587 A1   9/2004
WO   2004086723 A1   10/2004
(Continued)

OTHER PUBLICATIONS

3GPP TS 24.229, v5.12.0, Release 5, Digital cellular telecommunications system (Phase 2+); Universal Mobile Telecommunications System (UMTS); Internet Protocol (IP) multimedia call control protocol based on Session Initiation Protocol (SIP) and Session Description Protocol (SDP); Stage 3, Mar. 2005, 263 pages.
(Continued)

*Primary Examiner* — Man Phan
*Assistant Examiner* — Ryan Kavleski (57) ABSTRACT

A method of handling a Session Initiation Protocol (SIP) communication at a SIP application server within an IP Multimedia Subsystem, the method including handling a message received from a Serving Call/State Control Function node based upon a header of the message containing the URI of the served user. The SIP message is handled according to one of an originating case based upon a P-Asserted Identity contained in the SIP message or a terminating case using a Request-Uniform Resource Identifier (R-URI) of the SIP message, the appropriate case being identified in said header.

14 Claims, 8 Drawing Sheets

(51) Int. Cl.
*H04L 29/06* (2006.01)
*H04L 29/12* (2006.01)
*H04L 29/08* (2006.01)

(52) U.S. Cl.
CPC .......... *H04L 65/1016* (2013.01); *H04L 67/14* (2013.01); *H04L 67/147* (2013.01)

(58) Field of Classification Search
USPC .................. 370/261, 389; 709/206, 227, 230
See application file for complete search history.

(56) References Cited

U.S. PATENT DOCUMENTS

| | | |
|---|---|---|
| 2004/0199464 A1 | 10/2004 | Bright et al. |
| 2004/0203763 A1 | 10/2004 | Tammi |
| 2005/0013265 A1 | 1/2005 | Miyajima et al. |
| 2005/0193133 A1 | 9/2005 | Niemi et al. |
| 2005/0213606 A1 | 9/2005 | Huang et al. |
| 2006/0083242 A1 | 4/2006 | Pulkkinen |
| 2006/0154665 A1 | 7/2006 | Svensson et al. |
| 2006/0212511 A1 | 9/2006 | Garcia-Martin |
| 2006/0268781 A1 | 11/2006 | Svensson et al. |
| 2007/0061397 A1 | 3/2007 | Gregorat et al. |
| 2007/0100981 A1 | 5/2007 | Adamczyk et al. |
| 2009/0067411 A1 | 3/2009 | Heidermark et al. |
| 2009/0073964 A1 | 3/2009 | Milinski et al. |

FOREIGN PATENT DOCUMENTS

| | | |
|---|---|---|
| WO | 2004086800 A2 | 10/2004 |
| WO | 2005034472 A1 | 4/2005 |
| WO | 2005055549 A1 | 6/2005 |

OTHER PUBLICATIONS

Garcia-Martin, et al., Private Header (P-Header) Extensions to the Session Initiation Protocol (SIP) for the 3rd Generation Partnership Project (3GPP), RFC 3455, Jan. 2003, Network Working Group, pp. 1-35.

Van Elburg, The Session Initiation Protcol (SIP) P-Served-User Priviate-Header (P-Header), Apr. 16, 2007, SIPPING Working Group, p. 1-13.

Jennings, et al., Private Extensions to the Session Initiation Protocol (SIP) for Asserted Identity within Trusted Networks, RFC 3325, Nov. 2002, Network Working Group, pp. 1-19.

```
INVITE sip:userf_public1@home2.net SIP/2.0
Via: SIP/2.0/UDP
  scscf1.home1.net;branch=z9hG4bK344a65.1,
  SIP/2.0/UDP
  pcscf1.visited1.net;branch=z9hG4bK240f34.1,
  SIP/2.0/UDP
  [5555::aaa:bbb:ccc:ddd]:1357;comp=sigcomp;branch=z9
  hG4bKnashds7
Max-Forwards: 68
Route: <sip:as1.home1.net;lr>,
  <sip:cb03a0s09a2sdfglkj490333@scscf1.home1.net;lr>
Record-Route: <sip:orig@scscf1.home1.net;lr>,
  <sip:pcscf1.visited1.net;lr>
P-Asserted-Identity: "John Doe"
  <sip:user1_public1@home1.net>, <tel:+1-212-555-
  1111>
P-Access-Network-Info:
  userf_public1@home2.net;termreg
P-Charging-Vector: icid-
  value="AyretyU0dm+6O2IrT5tAFrbHLso=023551024";
  orig-ioi=home1.net
P-Charging-Function-Addresses:
  ccf=[5555::b99:c88:d77:e66];
  ccf=[5555::a55:b44:c33:d22];
  ecf=[5555::1ff:2ee:3dd:4ee];
  ecf=[5555::6aa:7bb:8cc:9dd]
Privacy:
From:
To:
Call-ID:
Cseq:
Contact:
Allow:
Content-Type:
Content-Length: (...)

```
INVITE sip:usert_public1@home2.net SIP/2.0
Via: SIP/2.0/UDP
  as1.home1.net;branch=z9hG4bK240f34.1
Max-Forwards: 70
Route:
  <sip:cb03a0s09a2sdfglkj490333@scscf1.home1.
  net;lr;orig >
P-Asserted-Identity: "John Doe"
  <sip:user1_public1@home1.net>, <tel:+1-212-
  555-1111>
P-Served-User-Identity:
  sip:userf_public@home2.net;orig
P-Charging-Vector: icid-
  value="AyretyU0dm+6O2IrT5tAFrbHLso=32355102
  4"
Privacy:
From: <sip:user1_public1@home1.net>;
  tag=234567
To: <sip:user2_public1@home2.net>
Call-ID: s09a233cbsdfglkj490303a0
Cseq: 278 INVITE
Contact: <sip:[7777::eee:ddd:ccc:aaa]>
Allow: INVITE, ACK, CANCEL, BYE, PRACK,
  UPDATE, REFER, MESSAGE
Content-Type: application/sdp
Content-Length: (...)

History-Info: <sip:Userf_public@home2.net>
  index=1,

<sip:Usert_public@home2.net;Reason=SIP%3B
  \cause%3D302> index=1.1
```

Figure 6

```
INVITE sip:usert_public1@home2.net SIP/2.0
Via: SIP/2.0/UDP scscf1.home1.net;branch=z9hG4bK344a65.1,
   SIP/2.0/UDP pcscf1.visited1.net;branch=z9hG4bK240f34.1,
   SIP/2.0/UDP
   [5555::aaa:bbb:ccc:ddd]:1357;comp=sigcomp;branch=z9hG4b
   Knashds7
Max-Forwards: 68
Route: <sip:as2.home1.net;lr>,
   <sip:cb03a0s09a2sdfglkj490333@scscf1.home1.net;lr>
Record-Route: <sip:orig@scscf1.home1.net;lr>,
   <sip:pcscf1.visited1.net;lr>
P-Asserted-Identity: "John Doe"
   <sip:user1_public1@home1.net>, <tel:+1-212-555-1111>
P-Served-User-Identity: sip:userf_public@home2.net;orig
P-Access-Network-Info:
P-Charging-Vector: icid-
   value="AyretyU0dm+6O2IrT5tAFrbHLso=023551024"; orig-
   ioi=home1.net
P-Charging-Function-Addresses:
   ccf=[5555::b99:c88:d77:e66];
   ccf=[5555::a55:b44:c33:d22];
   ecf=[5555::1ff:2ee:3dd:4ee];
   ecf=[5555::6aa:7bb:8cc:9dd]
Privacy:
From:
To:
Call-ID:
Cseq:
Contact:
Allow:
Content-Type:
Content-Length: (...)
History-Info: <sip:Userf_public@home2.net> index=1, <sip:Usert_public@home2.net;Reason=SIP%3B\cause%3D302
   > index=1.1
v=
o=
s=
c=
t=
m=
a=
a=
```

MESSAGE HANDLING IN AN IP MULTIMEDIA SUBSYSTEM

RELATED APPLICATIONS

This application is a continuation of co-pending U.S. patent application Ser. No. 12/094,752, filed Sep. 6, 2008, which is a 371 of International Application No. PCT/EP2006/067789, filed Oct. 26, 2006, which claims the benefit of GB Application No. 0524036.1, filed Nov. 15, 2005, the disclosures of which are fully incorporated herein by reference.

FIELD OF THE INVENTION

The present invention relates to Session Initiation Protocol message handling in an IP Multimedia Subsystem (IMS), and in particular, though not necessarily, to a method and apparatus for handling Session Initiation Protocol messages related to call forwarding at a Serving Call/Session Control Function within the IMS.

BACKGROUND TO THE INVENTION

IP Multimedia services provide a dynamic combination of voice, video, messaging, data, etc. within the same session. By growing the number of basic applications and the media which it is possible to combine, the number of services offered to the end users will grow, and the inter-personal communication experience will be enriched. This will lead to a new generation of personalised, rich multimedia communication services, including so-called "combinational IP Multimedia" services which are considered in more detail below.

IP Multimedia Subsystem (IMS) is the technology defined by the Third Generation Partnership Project (3GPP) to provide IP Multimedia services over mobile communication networks (3GPP TS 22.228, TS 23.218, TS 23.228, TS 24.228, TS 24.229, TS 29.228, TS 29.229, TS 29.328 and TS 29.329 Releases 5 to 7. IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS makes use of the Session Initiation Protocol (SIP) to set up and control calls or sessions between user terminals (or user terminals and application servers). The Session Description Protocol (SDP), carried by SIP signaling, is used to describe and negotiate the media components of the session. Whilst SIP was created as a user-to-user protocol, IMS allows operators and service providers to control user access to services and to charge users accordingly.

Figure 1:
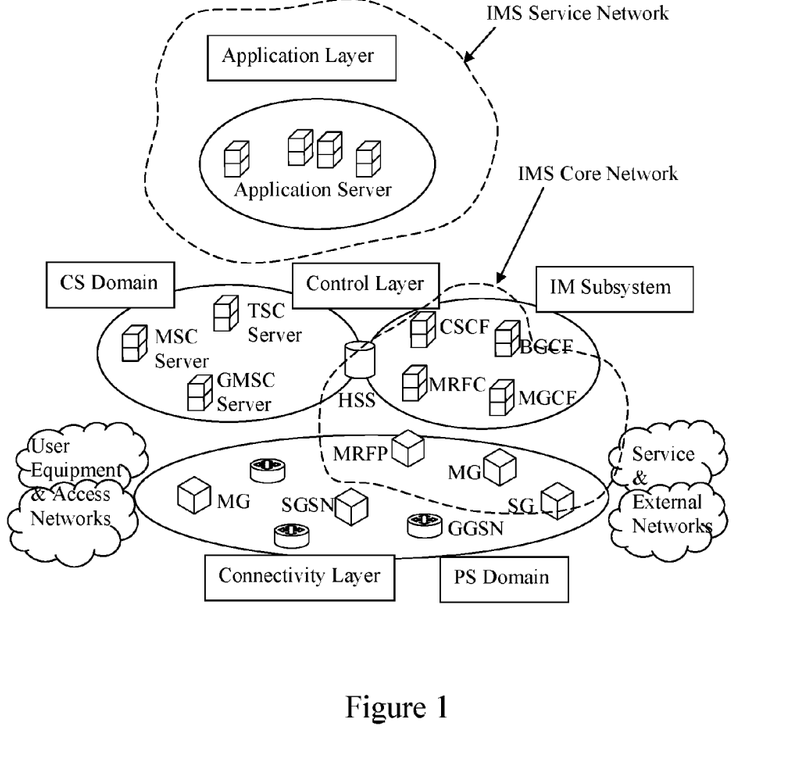
FIG. 1 illustrates schematically the integration of an IP Multimedia Subsystem into a 3G mobile communications system.

FIG. 1 illustrates schematically how the IMS fits into the mobile network architecture in the case of a GPRS/PS access network. Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

A user registers with the IMS using the specified SIP REGISTER method. This is a mechanism for attaching to the IMS and announcing to the IMS the address at which a SIP user identity can be reached. The user receives a unique URI from the S-CSCF that it shall use when it initiates a dialog. In 3GPP, when a SIP terminal performs a registration, the IMS authenticates the user, and allocates a S-CSCF to that user from the set of available S-CSCFs. Whilst the criteria for allocating S-CSCFs is not specified by 3GPP, these may include load sharing and service requirements. It is noted that the allocation of an S-CSCF is key to controlling (and charging for) user access to IMS-based services. Operators may provide a mechanism for preventing direct user-to-user SIP sessions which would otherwise bypass the S-CSCF.

During the registration process, it is the responsibility of the I-CSCF to select an S-CSCF if one is not already selected. The I-CSCF receives the required S-CSCF capabilities from the home network's Home Subscriber Server (HSS), and selects an appropriate S-CSCF based on the received capabilities. [It is noted that S-CSCF allocation is also carried out for a user by the I-CSCF in the case where the user is called by another party, and the user is not currently allocated an S-CSCF.] When a registered user subsequently sends a session request (e.g. SIP INVITE) to the IMS, the request will include the P-CSCF and S-CSCF URIs so that the P-CSCF is able to forward the request to the selected S-CSCF. This applies both on the originating and terminating sides (of the IMS). [For the terminating call the request will include the P-CSCF address and the UE address.]

Within the IMS service network, Application Servers (ASs) are provided for implementing IMS service functionality. Application Servers provide services to end-users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which Applications Servers should be "linked in" during a SIP Session establishment. Different IFCs may be applied to different call cases. The IFCs are received by the S-CSCF from an HSS during the IMS registration procedure as part of a user's User Profile. Certain Application Servers will perform actions dependent upon subscriber identities (either the called or calling subscriber, whichever is "owned" by the network controlling the Application Server). For example, in the case of call forwarding, the appropriate (terminating) application server will determine the new terminating party to which a call to a given subscriber will be forwarded.

Figure 2:
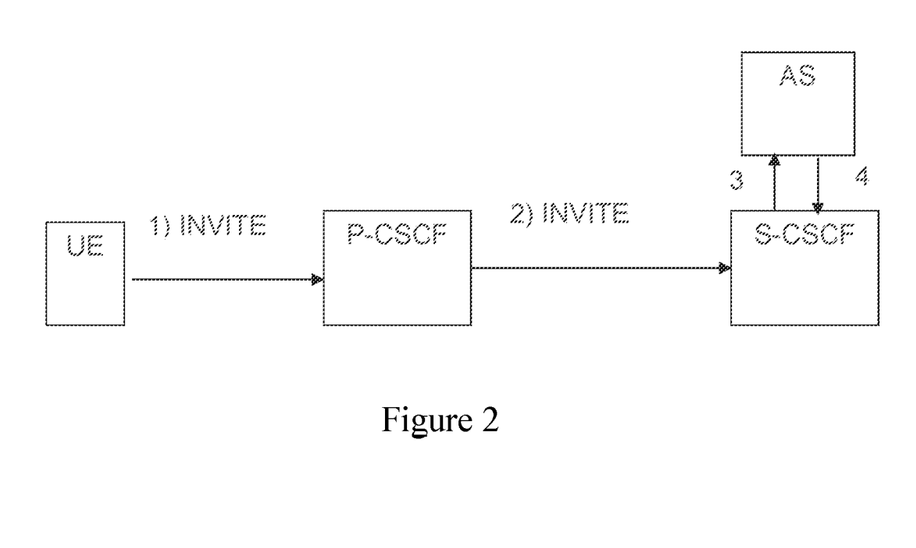
FIG. 2 illustrates the flow of a SIP INVITE on the originating call side of the IMS.

The working group known as ETSI TISPAN is developing the use of IMS for fixed broadband accesses. One of their tasks is to develop supplementary services based upon the IMS defined by 3GPP. These supplementary services will be defined in separate specifications although they will impact upon core specifications such as TS24.229. FIG. 2 illustrates schematically the message flow within the IMS for a SIP INVITE, on the call originating side, according to TS24.229 (chapter 5.4.3.2). At step 1), the INVITE is sent from the originating User Equipment (UE) to the P-CSCF. This INVITE includes in its header a so-called P-Preferred identity, as well as including the URI of the P-CSCF at the topmost level of the SIP route header and the URI of the S-CSCF as the second entry. The UE also includes the identity of the communicating partner in the Request-URI. Upon receipt of the INVITE, the P-CSCF checks that the originating UE is allowed to use the identity included as the P-Preferred identity, and if so includes it as the P-Asserted Identity in the outgoing INVITE. The P-Asserted Identity is an identity that is used among trusted SIP entities, typically intermediaries, to carry the identity of the user sending a SIP message as it was verified by authentication. The P-CSCF identifies the S-CSCF allocated to the originating UE by looking in the Route Header, and at step 2) forwards the amended INVITE to that S-CSCF.

The S-CSCF handles the call according to an originating call case procedure. The S-CSCF uses the P-Asserted Identity to check whether any relevant restrictions have been placed on the originating UE, e.g. is the UE barred from using the requested service. The S-CSCF also uses the P-Asserted Identity and call case to determine the IFCs for the UE. In the example of FIG. 2, it is assumed that the IFCs require that the S-CSCF forward (step 3)) the INVITE to a particular AS. The S-CSCF includes at the topmost level of the SIP route header the URI of the AS. It also includes in the subsequent level its own URI, together with an Original Dialog Identifier (ODI). The ODI is generated by the S-CSCF and uniquely identifies the call to the S-CSCF. The AS will itself perform authentication based upon the P-Asserted Identity contained in the message (the originating case). The appropriate case is identified to the AS by the S-CSCF (e.g. by sending the message to an appropriate port of the AS). When the AS returns the INVITE (step 4)) to the S-CSCF, the AS strips the URI of the AS from the route header, leaving the URI of the S-CSCF together with the ODI tag. The ODI tag allows the S-CSCF to determine that the INVITE relates to an earlier dialogue.

It is possible for the AS logic to require the setting up of a new session, in which case it would be necessary to provide a mechanism which allows the AS to replace the original R-URI with the URI of the new terminating User (the existing TSs do not as yet provide for this re-routing scenario). In this case, the identity of the origin, i.e. the P-Asserted Identity of the INVITE at step 4), can be either the identity of the originating UE, the identity of the AS, or an identity of a third party on whose behalf the AS is setting up the new session. In this case, the S-CSCF will repeat the call restriction check and determine the IFCs based upon the P-Asserted Identity contained in the "new" INVITE, assuming that the originating case is used. However, it is possible that the AS may signal to the S-CSCF that the terminating case is to be used, in which case the checks are carried out using the R-URI of the INVITE. Assuming that no further ASs are to be linked-in based upon the IFCs, the S-CSCF forwards the INVITE to the Request URI (R-URI) contained in the INVITE. This may be the R-URI contained in the original INVITE, or a new R-URI contained in the new INVITE if that is different.

Figure 3:
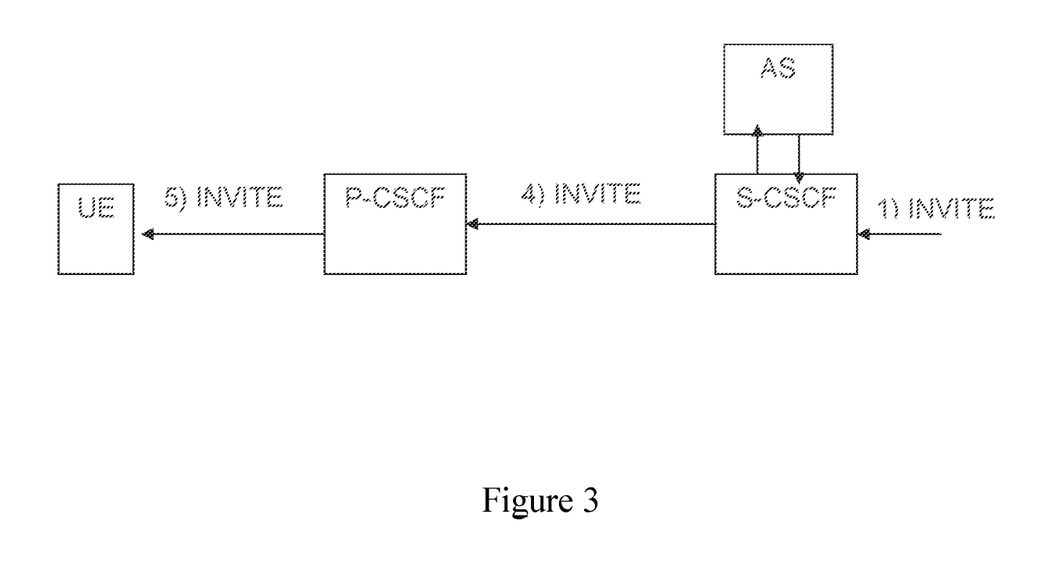
FIG. 3 illustrates the flow of a SIP INVITE on the terminating call side of the IMS.

FIG. 3 illustrates schematically the message flow within the IMS for a SIP INVITE, on the call terminating side (TS24.229: chapter 5.4.3.3). At step 1), the INVITE arrives from the I-SCSF (not shown) including the R-URI indicating the called party. The S-CSCF uses this R-URI to check for restrictions placed on the called party, and to obtain the IFCs. In this case, the IFCs do not indicate that an AS needs to be contacted. The S-CSCF will acquire the preloaded Route Headers for the called party, based on the R-URI, and send the INVITE forward to be UE based on these Route Header entries. The INVITE is received by the P-CSCF in accordance with the preloaded route in the S-CSCF, and the P-CSCF sends the INVITE to the UE in accordance with the contact header.

Figure 4:
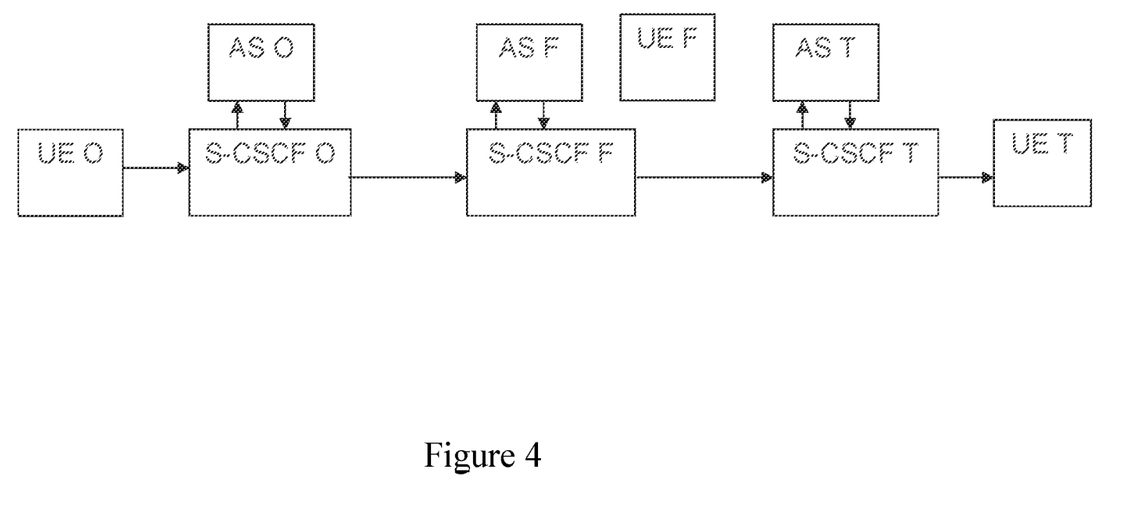
FIG. 4 illustrates the flow of a SIP INVITE in a call forwarding scenario within the IMS.

FIG. 4 illustrates an alternative INVITE message flow scenario, where a call from an originating terminal (UE-O) to a peer terminal (UE-F) is forwarded to a terminating terminal (UE-T). The call forwarding action is performed by an Application Server (AS-F). The call flow is as follows:

1) The INVITE is sent from UE-O addressed to UE-F (R-URI). The S-CSCF O performs the originating side call procedure as described with reference to FIG. 2.
2) After interaction with the AS-O (no change is made to the R-URI at this stage) the S-CSCF O sends the INVITE to the I-CSCF (not shown) of UE-F's home network. The I-CSCF will acquire the address of the S-CSCF where the UE-F is registered from the HSS. The INVITE is sent to that S-CSCF, i.e. to S-CSCF F. The S-CSCF F will check the restriction requirement and obtain the IFCs as described above (for the terminating side case) with reference to FIG. 3, i.e. based on the R-URI contained in the INVITE. In the scenario illustrated in FIG. 4, the INVITE will be sent to the AS-F where the call forwarding is activated.
3) The AS-F will authorise the process based upon the R-URI (assuming the terminating case).
4) The AS-F will then change the R-URI in the INVITE header from that of UE-F to that of UE-T. The modified INVITE will be returned to the S-CSCF F.
5) The S-CSCF F will send the INVITE to the I-CSCF of the UE-T network, and the I-CSCF (not shown) will interrogate the HSS to get the address of the S-CSCF T of UE-T, and forward the INVITE to the S-CSCF T.
6) The S-CSCF T will perform the terminating procedure as described with reference to FIG. 3, on the basis of the R-URI contained in the INVITE (that is the R-URI of UE-T).

SUMMARY OF THE INVENTION

Referring again to FIG. 4, at step 5), it will additionally be necessary for the S-CSCF F to check whether there are any restrictions on the forwarding User, UE-F. To do this, the S-CSCF will typically use the originating side procedure of FIG. 2. However, in the absence of any special procedures implemented by the AS-F, the INVITE returned to the S-CSCF F by the AS-F will include in the P-Asserted Identity field the identity of the UE-O. If the S-CSCF F were to perform an originating side check on the INVITE using the P-Asserted Identity, the S-CSCF F will be unable to locate a record for this identity as it does not "belong" to the S-CSCF F (rather it belongs to the S-CSCF O).

A solution to this problem might be for the AS-F to replace the P-Asserted Identity of UE-O with that of UE-F. However, this is unlikely to be accepted by operators who will prefer to leave the P-Asserted Identity unchanged from end-to-end. From the operators' point of view, the P-Asserted Identity field is akin to the traditional (PSTN) calling line identity. Other solutions to this problem must therefore be sought.

Whilst the forwarding user will typically be considered as an originating User in the call forwarding scenario, this need not be the case, and may be considered as a terminating User. In this case, when the S-CSCF F receives the INVITE from the AS-F, the S-CSCF will want to perform a terminating side check on the INVITE. (The message sent from the AS-F to the S-CSCF will contain a parameter to indicate to the S-CSCF whether the message is to be handled according to the terminating case or the originating case.) However, this check will also fail as the R-URI contained in the INVITE identifies the UE-T, and that R-URI belongs to the S-CSCF T rather than to the S-CSCF F. Changing the P-Asserted Identity will of course not address this problem.

These problems arise with messages other than INVITE, including, for example, other initial request messages and standalone messages.

It is an object of the present invention to overcome the problems identified above, whilst avoiding the need to change the P-Asserted Identity contained within a SIP message. This and other objects are achieved by introducing a new header into SIP messages at the S-CSCF prior to forwarding to an Application Server, the new header containing the URI of the User that is served by the S-CSCF and to which the message relates.

According to a first aspect of the present invention there is provided a method of handling a Session Initiation Protocol communication within an IP Multimedia Subsystem, the method comprising: receiving a Session Initiation Protocol message at a Serving Call/State Control Function serving a User identified by a R-URI of the message; at the Serving Call/State Control Function, adding to the message a further header, this header explicitly identifying the URI of the User served by the Serving Call/State Control Function; forwarding the message to an Application Server; and at the Application Server, handling the message on the basis of criteria defined for the User identified in said further header Said step of handling the message at the Application Server may include changing the R-URI in the message to a URI of a User to which the message is to be re-routed, and returning the message to the Serving Call/State Control Function.

Said message may be forwarded directly to said Application Server by the S-CSCF, or subsequent to exchanges of the message between the S-CSCF and one or more other Application Servers. The earlier exchanges may introduce modifications to the message headers.

Said step of handling the message on the basis of criteria defined for the User identified in said further header may comprise obtaining re-routing criteria for the User identified in said further header.

Preferably, the method further comprises receiving the message at the S-CSCF and identifying the original R-URI on the basis of the Original Dialog Identifier contained in the returned message, and determining IFCs for the served User on the basis of that R-URI. Alternatively, in the event that the returned message contains said further header, the S-CSCF may determine the IFCs based upon the User identified in the further header.

Whilst the invention is applicable to any process (i.e. Application Server) that handles re-routing of a message, a particular application is that of SIP call forwarding.

Said further header is identified by a header identifier which is understood by both the S-CSCF and the AS. Typically, this header is a prefix, e.g. "P-Served-User-Identity".

Preferably, the P-Asserted Identity is the same in both the message initially received at the S-CSCF and the message returned from the Application server to the S-CSCF, this identity identifying the originating User.

Said step of handling the message received at the Application Server may comprise handling the message according to one of an originating or terminating case, the appropriate case being identified in the message received at the Application Server from the S-CSCF, for example in said further header.

Said step of authenticating the served User at the S-CSCF may comprise handling the message according to one of an originating or terminating case, the appropriate case being identified in the message received by the S-CSCF from the Application Server.

According to a second aspect of the present invention there is provided a Session Initiation Protocol Application Server of an IP Multimedia Subsystem having processing means for handling a message received from a Serving Call/State Control Function, the means being arranged to handle the message based upon a header of the message containing the URI of the served user, this header having been introduced by the Serving Call/State Control Function and being other than the P-Asserted Identity and the R-URI.

According to a third aspect of the present invention there is provided a Serving Call/State Control Function node of an IP Multimedia Subsystem, the Serving Call/State Control Function node comprising means for receiving a SIP message and for applying Initial Filter Criteria to the message, and, in the event that the Initial Filter Criteria require forwarding of the message to an Application Server, for adding a header to the forwarded message containing an identity of a served User to which the message relates.

According to a further aspect of the present invention there is provided computer program code for carrying out the method of the first aspect of the invention.

The invention is applicable in particular to Session Initiation Protocol initial request messages, e.g. INVITE, and to standalone Session Initiation Protocol messages, e.g. messages relating to presence services.

DETAILED DESCRIPTION OF CERTAIN EMBODIMENTS

The problems involved in handling a "forwarding" scenario within the IP Multimedia Subsystem have been described above. It is desirable to be able to provide a mechanism for handling call forwarding which allows both the Application Server (AS) and the S-CSCF to authorise, check restriction requirements, and/or determine IFCs for the appropriate user, i.e. that user which is served by the S-CSCF, and which deals both with the terminating case and the originating case to ensure appropriate flexibility.

Consider now an INVITE arriving at the S-CSCF F from some originating user (UE-O). The INVITE will include in its header a R-URI pointing to one of S-CSCF F's registered users (UE-F), namely userf_public1@home2.net. The INVITE also includes the P-Asserted Identity of the originating user, namely "John Doe" <sip:user1_public1@home1.net>, <tel:+1-212-555-1111>. The S-CSCF handles this message using the terminating case (identified by the message being received at a particular port number in the absence of a specific indication within the message), and hence will obtain the appropriate IFCs based upon the R-URI of the message. One of these IFCs will indicate that the message should be forwarded to an Application Server.

Upon determining that the message is to be forwarded to an Application Server, the S-CSCF will add an additional header to the INVITE. This header is referred to here as the "P-Served-User-Identity", and contains the identity, SIP-URI, or TEL URL of the user that is served by the S-CSCF and of which the S-CSCF has knowledge. The header also contains the call case which should be applied by the Application Server. Example headers are as follows:

P-Served-User-Identity: sip:alice@home1.net;orig
P-Served-User-Identity: sip:bob@home2.net;termunreg
P-Served-User-Identity: sip:bob@home2.net;termreg Typically, in the case of call forwarding, the originating case will be applied. The P-Served-User-Identity header will always be added to the message, regardless of the Application Server to which the message is to be forwarded.

Figure 5:
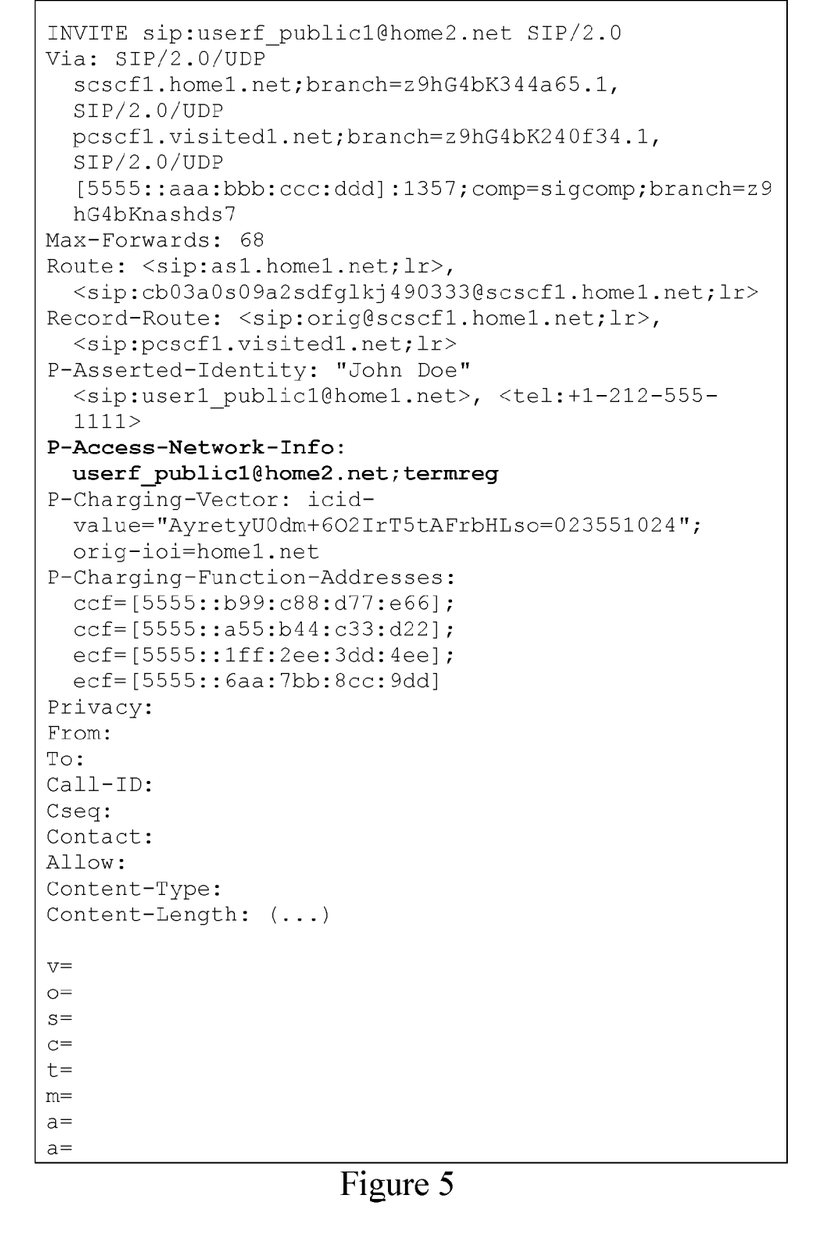
FIG. 5 shows the message header structure for a SIP INVITE message sent from an S-CSCF to an Application Server.
Figure 6:
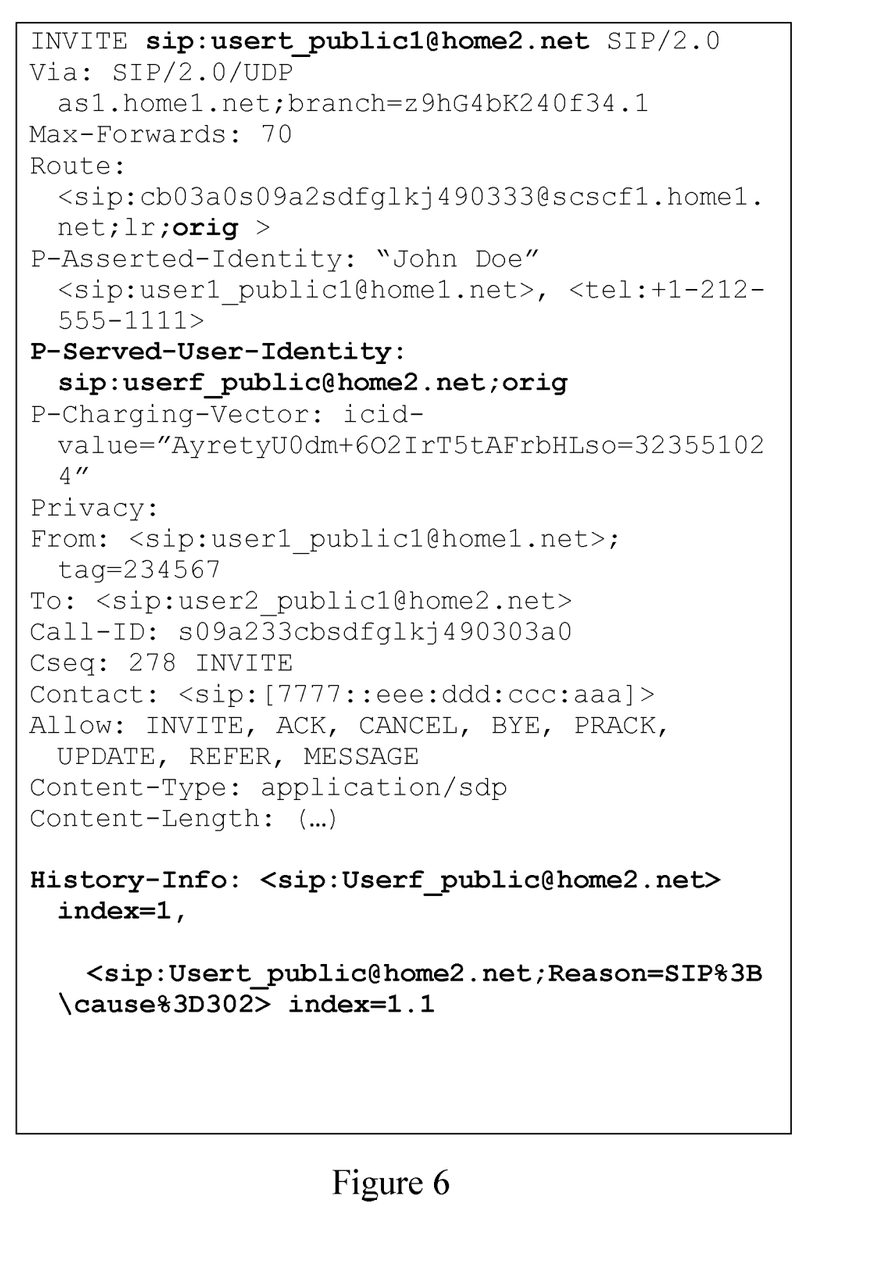
FIG. 6 shows the message header structure for a SIP INVITE message sent from an Application Server to an S-CSCF.

The S-CSCF will also perform the standard operations of adding the SIP URI of the AS as the topmost URI of the route header, i.e. sip:as1.home1.net;Ir, and including its own SIP URI beneath the AS URI in the route header together with the "original dialog identifier" (ODI). The resulting exemplary INVITE message structure is shown in FIG. 5, where the URI of the S-CSCF F added to the route header is "scscf1.home1.net;Ir" and the ODI is "cb03a0s09a2sdfglkj490333". The message is then forwarded to the Application Server over the ISC interface. The S-CSCF F maintains state information for the session to which the INVITE relates. This information includes the ODI and the identity of the served User F.

Upon receipt of the INVITE message from the S-CSCF, the Application Server will always perform authorisation based upon the P-Served-User-Identity, according to the case (originating or terminating) identified in the message. In the case that call forwarding is to be performed, based upon the R-URI contained in the INVITE, the Application Server will replace the original R-URI with the URI of the User to which the call is to be forwarded (UE-T). In addition, the Application Server will add the "orig" parameter in the route header to indicate that the INVITE is to be dealt with using the originating call type procedure. The topmost routing header, i.e. the URI of the Application Server, is stripped from the message, and the message sent back to the S-CSCF. The returned message retains the P-Served-User-Identity header.

The default operation of the S-CSCF when receiving a message containing a P-Served-User-Identity header is to perform the IFC check based upon the served User contained in the session state information corresponding to the ODI of the received message. (Whilst the User identity contained in the P-Served-User-Identity header could be used for this purpose, it is preferable to avoid changing the existing procedures as much as possible). The S-CSCF will apply the terminating or originating case in dependence upon the case identified in the route header (or based upon the port number at which the INVITE is received from the AS). Typically, a forwarded INVITE will be handled according to the originating call type. (In this example, the case contained in the P-Served-User-Identity header is not used by the S-CSCF, although this is possible.)

In the absence of an ODI in a message received over the ISC, the S-CSCF will perform the necessary checks based upon either the P-Asserted Identity or the R-URI.

Following completion of the IFC check, the S-CSCF will process the INVITE according to the identified IFCs. This may involve forwarding the message directly to the terminating User UE-T, or possibly forwarding it to a further Application Server.

Figure 7:
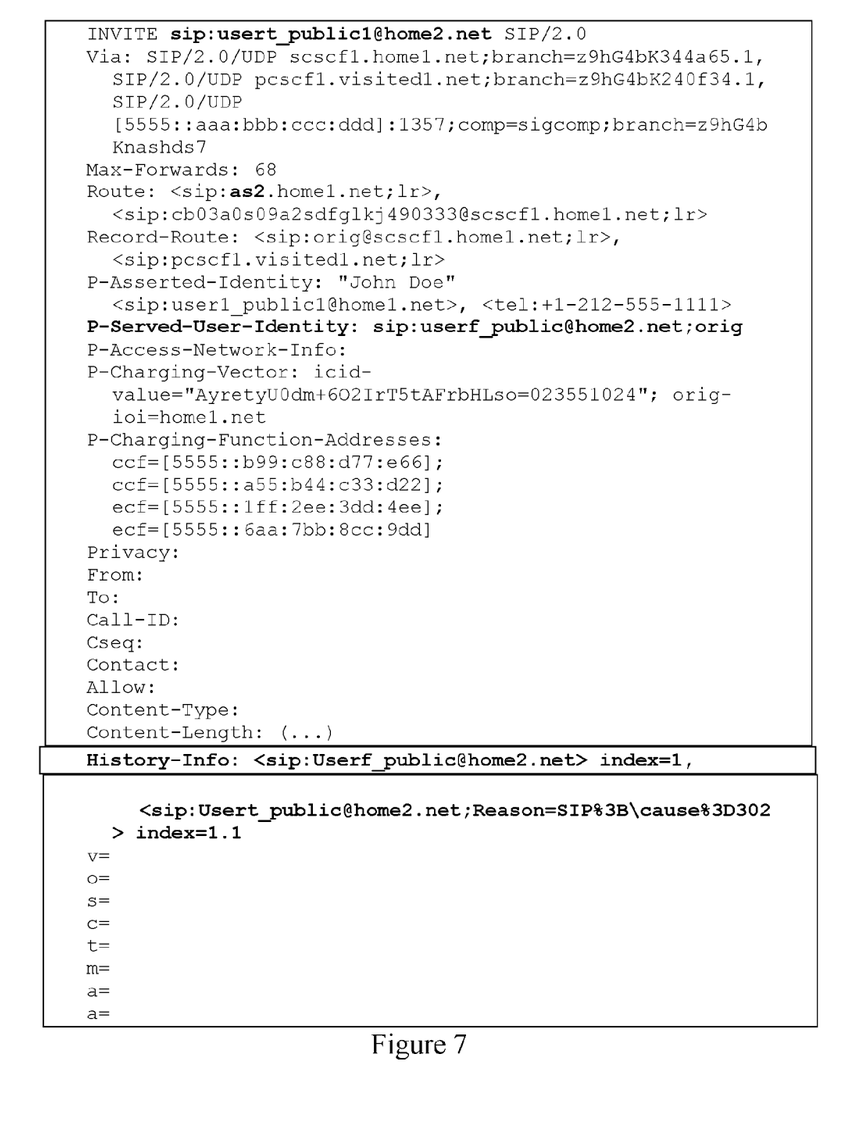
FIG. 7 shows the message header structure for a SIP INVITE message sent from an S-CSCF to a second Application Server.
Figure 8:
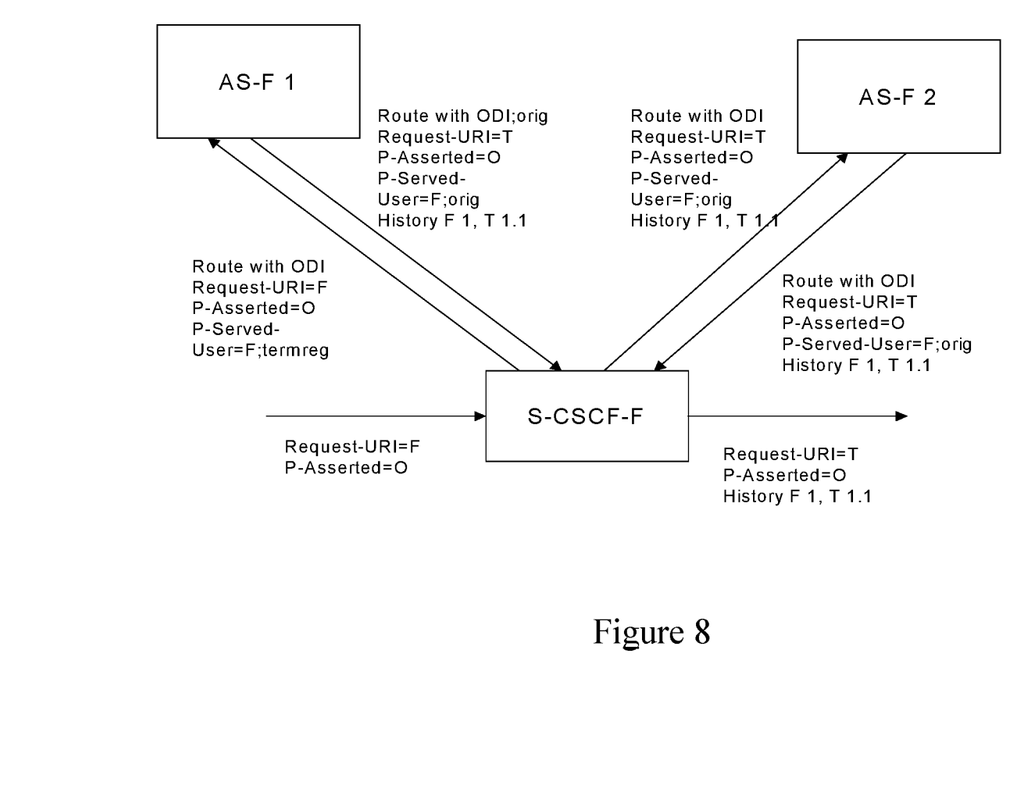
FIG. 8 illustrates a signaling exchange between IMS entities involving the message structure of FIG. 7.

In some cases, the IFC check carried out at the S-CSCF in response to receipt of a SIP message (INVITE) over the ISC interface may require that the message be forwarded to a further Application Server. An example message forwarded to a second AS is illustrated in FIG. 7. Again, the P-Served-User-Identity header contains the URI of User F, namely userf_public1@home2.net, whilst the P-Asserted Identity is that of the originating User and the R-URI is that of the new terminating User. FIG. 8 illustrates the message exchange between the S-CSCF F and two AS servers, AS-F 1 and AS-F 2.

It will be appreciated by the person of skill in the art that various modifications may be made to the embodiments described above without departing from the scope of the present invention.

The invention claimed is:

1. A method of handling a Session Initiation Protocol communication within an IP Multimedia Subsystem, the method comprising:
   receiving a Session Initiation Protocol (SIP) message at a Serving Call/Session Control Function (S-CSCF) node serving a User;
   applying Initial Filter Criteria to the received SIP message; and
   if the Initial Filter Criteria require forwarding of the message to a SIP Application Server, adding a P-Served-User header to the forwarded message, the P-Served-User header identifying the User served by the S-CSCF node and conveying whether the message is originated by or destined for the served User.

2. The method according to claim 1, wherein said message is forwarded directly to said SIP Application Server by the S-CSCF node, or subsequent to exchanges of the message between the S-CSCF node and one or more other Application Servers.

3. The method according to claim 1, the method further comprising:
   receiving the message at the S-CSCF from the SIP Application Server, and
   identifying an Request-Uniform Resource Identifier (R-URI) associated with the served User on the basis of an Original Dialog Identifier contained in the message, and
   determining Initial Filter Criteria (IFC) for the served User on the basis of that R-URI.

4. The method according to claim 1, wherein said P-Served-User header is understood by both the S-CSCF node and the SIP Application Server and identifies the User served by the S-CSCF node with a SIP-URI or TEL-URL.

5. The method according to claim 1, the method further comprising:
   receiving the message back from the SIP Application Server after having forwarded the message to the SIP Application Server, wherein a P-Asserted Identity is the same in both the message initially received at the S-CSCF and the message returned back from the SIP Application server to the S-CSCF node, the P-Asserted identity identifying an originating User.

6. The method according to claim 1, the method further comprising:
   if the Initial Filter Criteria require forwarding of the message to the SIP Application Server, adding to the message an Original Dialog Identifier before forwarding the message to the SIP Application Server; and maintaining, in the S-CSCF node, state information to which the message relates, the state information including the Original Dialog Identifier and an identity of the User served by the S-CSCF.

7. The method according to claim 6, the method further comprising:

receiving the message at the S-CSCF from the SIP Application Server, and identifying an Request-Uniform Resource Identifier (R-URI) associated with the served User on the basis of the Original Dialog Identifier contained in the message, and determining Initial Filter Criteria (IFC) for the served User on the basis of that R-URI.

8. A Serving Call/Session Control Function (S-CSCF) node of an IP Multimedia Subsystem, the Serving Call/Session Control Function node comprising:

a processor; and a memory containing instructions that, when executed by the processor, cause the S-CSCF node to:

receive a Session Initiation Protocol message at a Serving Call/Session Control Function (S-CSCF) node serving a User;

at the S-CSCF node, add to the message a P-Served-User header, the P-Served-User header explicitly identifying the Uniform Resource Identifier (URI) of the User served by the S-CSCF node and conveying whether the message is originated by or destined for the served User; and forward the message to a SIP Application Server to be handled on the basis of criteria defined for the User identified in said P-Served-User header.

9. The S-CSCF node of claim 8, wherein the instructions, when executed, further cause the S-CSCF node to:

add to the message an Original Dialog Identifier before forwarding the message to the SIP Application Server;

maintain, in the S-CSCF node, state information to which the message relates, the state information including the Original Dialog Identifier and an identity of the User served by the S-CSCF;

receive the message back from the SIP Application Server after the SIP Application Server has handled the message by obtaining re-routing criteria for the User identified in said P-Served-User header;

identify a Request-Uniform Resource Identifier (R-URI) associated with the served User included in the session state information corresponding to the Original Dialog Identifier of the message received back from the SIP Application Server; and determine Initial Filter Criteria (IFC) for the served User on the basis of that R-URI.

10. A system comprising the S-CSCF node of claim 8 and further comprising:

the SIP Application Server, wherein the SIP application server is configured to handle the message forwarded by the S-CSCF node according to:

an originating case based upon a P-Asserted Identity contained in the message if the P-Served-User header conveys that the message is originated by the served User, or a terminating case using the R-URI of the INVITE message if the P-Served-User header conveys that the message is destined for the served User.

11. A method of handling a Session Initiation Protocol communication within an IP Multimedia Subsystem, the method comprising:

receiving a Session Initiation Protocol (SIP) message at a SIP Application Server from a Serving Call/Session Control Function (S-CSCF) node;

handling the SIP message based upon a P-Served-User header having been introduced into the message by the S-CSCF node, the P-Served-User header containing the URI of a User served by the S-CSCF node, and conveying whether the message is originated by or destined for the served User, wherein the SIP message is handled according to one of an originating case based upon a P-Asserted Identity contained in the SIP message or a terminating case using a Request-Uniform Resource Identifier (R-URI) of the SIP message, the appropriate case being identified in said P-Served-User header.

12. The method according to claim 11, wherein said step of handling the SIP message includes changing the R-URI in the message to a URI of the User to which the message is to be re-routed, and returning the message to the S-CSCF node.

13. The method according to claim 11, wherein said step of handling the SIP message includes obtaining re-routing criteria for the User identified in said P-Served-User header.

14. The method according to claim 11, wherein said handling of the SIP message comprises implementing a call forwarding process.

* * * * *

UNITED STATES PATENT AND TRADEMARK OFFICE
CERTIFICATE OF CORRECTION

PATENT NO. : 9,648,048 B2  
APPLICATION NO. : 15/176333  
DATED : May 9, 2017  
INVENTOR(S) : Van Elburg et al.

Page 1 of 2

It is certified that error appears in the above-identified patent and that said Letters Patent is hereby corrected as shown below:

On the Title Page

On Page 2, in Item (56), under "OTHER PUBLICATIONS", in Column 2, Line 5, delete "Protcol" and insert -- Protocol --, therefor.

On Page 2, in Item (56), under "OTHER PUBLICATIONS", in Column 2, Line 6, delete "Priviate-Header" and insert -- Private-Header --, therefor.

In the Drawings

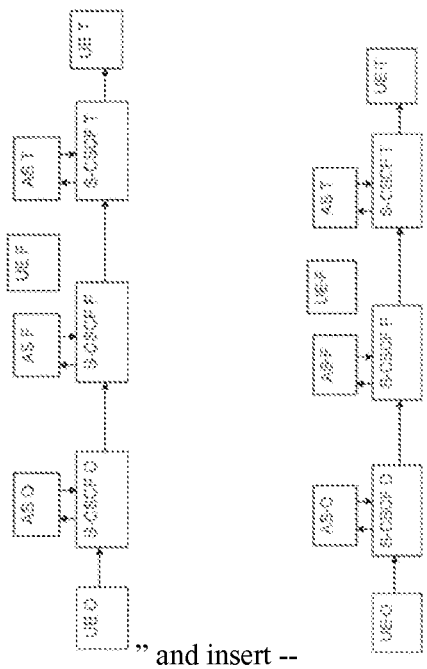

In Fig. 4, Sheet 4 of 8, delete " " and insert -- -- , therefor.

Signed and Sealed this  
Fourteenth Day of November, 2017

Joseph Matal  
*Performing the Functions and Duties of the*  
*Under Secretary of Commerce for Intellectual Property and*  
*Director of the United States Patent and Trademark Office*

In the Specification

In Column 1, Line 7, delete "Sep. 6, 2008," and insert -- Sep. 26, 2008, now Pat. No. 9,392,027, --, therefor.

In Column 1, Line 40, delete "5 to 7." and insert -- 5 to 7). --, therefor.

In Column 1, Line 56, delete "Call/Session" and insert -- Call Session --, therefor.

In Column 3, Lines 59-62, delete "Header.......header." and insert the same at Line 58, after "Route", as a continuation paragraph.

In Column 5, Line 20, delete "header" and insert -- header. --, therefor.

In Column 6, Line 32, delete "IMS; and" and insert -- IMS; --, therefor.

In Column 7, Line 24, delete "i.e. sip:as1.home1.net;Ir," and insert -- i.e. sip:as1.home1.net;lr, --, therefor.

In Column 7, Line 29, delete ""scscf1.home1.net;Ir"" and insert -- i.e. "scscf1.home1.net;lr" --, therefor.

In the Claims

In Column 8, Line 26, in Claim 1, delete "Call/Session" and insert -- Call Session --, therefor.

In Column 9, Line 17, in Claim 8, delete "Call/Session" and insert -- Call Session --, therefor.

In Column 9, Line 24, in Claim 8, delete "Call/Session" and insert -- Call Session --, therefor.

In Column 10, Line 23, in Claim 11, delete "Call/Session" and insert -- Call Session --, therefor.